us005238699A

United States Patent [19]

King et al.

[11] Patent Number: 5,238,699
[45] Date of Patent: Aug. 24, 1993

[54] READY-TO-EAT, LOW/NO-FAT PUDDINGS AND PROCESS

[75] Inventors: Loren D. King, LaGrangeville, N.Y.; Richard R. Leshik, Brookfield, Conn.

[73] Assignee: Kraft General Foods, Inc., Northfield, Ill.

[21] Appl. No.: 800,617

[22] Filed: Nov. 27, 1991

[51] Int. Cl.⁵ .................. A23L 1/187; A23L 1/0532
[52] U.S. Cl. ................................... 426/573; 426/575; 426/577
[58] Field of Search ............... 426/573, 575, 577, 578, 426/579

[56] References Cited

U.S. PATENT DOCUMENTS

| 2,949,366 | 8/1960 | Hunter et al. | 99/131 |
| 3,409,443 | 11/1968 | Polya | 426/577 |
| 3,619,208 | 11/1971 | Bahosky et al. | 426/577 |
| 3,619,209 | 11/1971 | Hegadorn | 426/577 |
| 3,970,767 | 7/1976 | Tessler | 426/579 |
| 4,081,566 | 3/1978 | Haber | 426/578 |
| 4,234,611 | 11/1980 | Kahu et al. | 426/579 |
| 4,262,031 | 4/1981 | Carpenter | 426/579 |
| 4,305,970 | 12/1981 | Moran et al. | 426/603 |
| 4,388,337 | 6/1983 | Cawdron | 426/579 |
| 4,395,429 | 6/1993 | Campagne et al. | 426/271 |
| 4,568,553 | 2/1986 | Murray et al. | 426/579 |
| 4,623,552 | 11/1986 | Rapp | 426/575 |
| 4,788,075 | 11/1988 | Joseph et al. | 426/579 |
| 4,888,194 | 12/1989 | Andersen et al. | 426/570 |
| 4,906,489 | 3/1990 | Flango, Jr. et al. | 426/579 |
| 4,944,955 | 7/1990 | Bassa et al. | 426/579 |

FOREIGN PATENT DOCUMENTS

| 0221709 | 5/1987 | European Pat. Off. |
| 690169 | 4/1953 | United Kingdom |
| 1463113 | 2/1977 | United Kingdom |

Primary Examiner—Jeanette Hunter
Attorney, Agent, or Firm—Thomas R. Savoie

[57] ABSTRACT

This invention relates to packaged ready-to-eat, high-temperature processed low/no fat, puddings in which calcium-sensitive, thermally-irreversible gelling hydrocolloids, such as sodium alginate, are utilized in the pudding formulation as a total or partial replacement for the fat component. A process for preparing such puddings is also described.

8 Claims, No Drawings

READY-TO-EAT, LOW/NO-FAT PUDDINGS AND PROCESS

BACKGROUND OF THE INVENTION

Consumers have in recent times been desirous of eating wholesome and nutritious snack foods. Milk-containing puddings have long been considered nutritious and wholesome foods. Consumers are, however, requiring that the foods they eat, particularly snack food and dessert items, be essentially ready-to-eat. Thus, the amounts of cooked puddings and even instant puddings prepared in the home environment has been decreasing in recent years.

To fill the desire of consumers for dessert or snack items which require no preparation on the part of the consumer, there exists ready-to-eat puddings which are usually marketed in single-service portions. Initially these products were marketed as shelf-stable, canned products. These canned puddings, which have been subjected to a retort step during processing, do not, however, possess the texture and flavor which consumers associate with home-cooked pudding. More recently, single-service portions of refrigerated, pudding products have entered the market.

A process and formulations for preparing aseptically-packaged pudding is described in commonly-assigned, U.S. Pat. No. 4,788,075 to Joseph et al. This patent is hereby incorporated by reference. The Joseph et al. patent describes the preparation of aseptically-packaged pudding which has a creamy texture comparable to cooked pudding and which contains milk solids, fat and relatively low level (below 5%) of a chemically-modified food starch.

Consumers also are desirous of reducing their caloric intake, hence low-fat and no-fat products which have a taste and texture comparable to their full-fat counterparts are much sought after. Unfortunately fat is a highly-functional ingredient in providing texture and mouthfeel and in controlling flavor perception in food products such as puddings. Thus it is not a simple matter to produce low/no fat puddings which are acceptable to the consumer.

Other patents related to the production of aseptically-packaged and/or refrigerated puddings are U.S. Pat. No. 4,906,489 to Flango, Jr. et al. and 4,623,552 to Rapp. U.S. Pat. No. 4,888,194 to Andersen et al. discloses an aseptically-packaged, whippable dairy cream, having a fat content of about 35 to 40% by weight, which is made resistant to syneresis during standing as a whipped foam by the addition of a sodium alginate ingredient.

SUMMARY OF THE INVENTION

This invention relates to a formulation and a process for preparing low/no fat, ready-to-eat pudding-like desserts which is subjected to ultra-high temperature (i.e., above 265° F.) during processing and packaged in a manner which results in sterility or a relatively-low level of microbiological activity. In accordance with this invention, the pudding may be packaged under aseptic conditions resulting in a shelf-stable product. Alternatively, the pudding may be packaged under controlled conditions which results in a low microbial count yielding a product that would be suitable for refrigerated distribution. As used in this invention the term "pudding" is meant to include viscous fluids which have a soft gel texture and a smooth, creamy mouthfeel. Pudding will typically contain milk solids, but may be formulated in a manner which avoids the use of milk solids (e.g. lactose).

According to this invention all or a significant portion of the fat normally contained in pudding formulations is omitted, such that the fat content of the pudding is less than 3%, preferably less than 0.5%, by weight, and the omitted fat is replaced by a calcium-sensitive, irreversible, gelling hydrocolloid, such as algin (e.g. sodium alginate). Other comparable hydrocolloids, such as low methoxyl pectin or gellan gum may be used in lieu of all or a portion of the algin. The use level for these hydrocolloids in the pudding formulation will be from about 0.05 to 1.5% by weight of the pudding, and in the case of algins the use level is preferably from 0.05 to 0.5%. The term "calcium-sensitive gelling hydrocolloid" is meant to include hydrocolloid materials which will gel upon contact with sufficient levels of calcium ions. Gellan gum is a linear extracellular, anionic polysaccharide secreted by the microorganism *Auromouas elodea*. "Irreversible" is a term commonly used when describing gums and refers to a gel not dissolving merely upon heating to or slightly above its gellation temperature.

The level of the hydrocolloid should be sufficient to provide the desired texture and the pudding should contain sufficient free calcium, either from milk or added calcium salts, to complex with and gel the hydrocolloid. Levels of calcium-sensitive, gelling hydrocolloid in excess (on a stoichiometric basis) of the level of free calcium level will not provide additional gel strength or will be wasteful. Typically, the calcium-sensitive hydrocolloids are the only non-starch gelling agent contained in the formulation.

According to this invention it has been found possible to add the ungelled calcium-sensitive hydrocolloid component to dairy ingredients at a temperature below 150° F. (65.6° C.), preferably between about 90° F. (32.2° C.) and 130° F. (54.4° C.). This approach is contrary to the prior art practice, as evidenced by the Andersen et al. patent, which directs that sodium alginate be added to dairy ingredients at a "high temperature, (i.e., above 60° C.)" in order to avoid formation of an alginate-calcium complex. It is now believed that the alginate-calcium complex formed at low-temperature is broken with ultra-high temperature and shearing and that during cooling, the alginate becomes complexed with calcium resulting in a texture which is comparable to full-fat (i.e., in excess of 3.0% fat) ready-to-eat puddings.

The texture obtained in low/no fat, ready-to-eat puddings with the use of sodium alginate, or other calcium-sensitive gelling hydrocolloid, is preferred to the texture obtained via the use of alternative hydrocolloids, such as xanthan gum or carrageenan, or increased levels of the raw starch component of the pudding formulation.

DETAILED DESCRIPTION OF THE INVENTION

An ultra-high temperature (above 265° F.) processed, and packaged pudding formulation having a fat content of from 0 to 3% is prepared using a combination of conventional ready-to-eat pudding ingredients, such as water, milk solids (e.g., non-fat milk solids) and/or another source of soluble calcium, starch (i.e. uncooked starch) and/or other thickening agents, sweetener (e.g., sucrose), emulsifier, flavor and color, in combination with from 0.01 to 1.5% of a calcium-sensitive, irreversible, gelling hydrocolloid, such as sodium alginate, by weight of the pudding. The preferred hydrocolloid is a high molecular weight sodium alginate (e.g., 120,000 to 190,000 M.W.), at a level of from 0.01 to 0.5%, preferably 0.08 to 0.3%. High molecular weight algins are preferred since a lower usage level is possible compared to lower molecular weight algins.

According to one method for preparing the pudding product of this invention, the liquid ingredients, such as water and milk (e.g., whole, low-fat or skim milk), are mixed and heated to a temperature between about 90° and 130° F. Any fatty ingredients (e.g. fats, emulsifiers and/or stabilizers) may then be added to the heated liquid components. The dry ingredients, including the calcium-sensitive gelling hydrocolloid, are then added to the liquid mix using a relatively high level of agitation. An induction mixer is one type of device for providing the desired agitation. Any volatile flavor component should be added last in order to minimize volatilization exposure to heat. The mixture is thoroughly mixed, such as in a homogenizer, cooked at a temperature above 265° F., preferably 275° to 300° F., and then cooled. Cooking may be effected using either direct or indirect heat with a scraped-surface heat exchanger being typical for indirect heating and steam injection being a typical procedure for applying direct heat. The cooling step should be done while the mix is being subjected to shear conditions. Cooling may be accomplished using plate, tubular and/or scraped-surface heat exchangers. The cooled pudding formulation is then packaged at a temperature below 140° F., preferably below about 110° F. and typically at about 75° F. The formulations of this invention processed in this manner produce a packaged low/no fat pudding which has the smooth texture and the weak, soft gel structure of full-fat, ready-to-eat puddings.

The puddings of this invention will typically have a composition in accordance with the following formula which represents an unflavored and uncolored pudding mix.

| Ingredient | Broad Range (% weight) | Preferred Range (% weight) |
| --- | --- | --- |
| Water | 60–85 | 68–80 |
| Sweetener | 0.05–25 | 7–17 |
| Starch (uncooked) | 2–9 | 3.5–7 |
| Non-Fat Milk Solids | 1.5–10 | 2–7 |
| Fat | 0–3 | 0–0.5 |
| Emulsifier/Stabilizer | .05–0.5 | 0.1–0.4 |
| Calcium-Sensitive Gelling Hydrocolloid | .01–1.5 | 0.08–0.9 |

Flavor and color agents and other functional ingredients may be added to the pudding formulation as desired so as to produce the desired end product, such as vanilla, chocolate or butterscotch pudding. The use of a food-grade alkali to adjust the pH of the pudding to a range of about 6.5 to about 7.0 may be desirable.

The sweetener component employed in formulating the pudding composition of the present invention is chosen to provide a desired degree of sweetness and solids to the final pudding product. Sucrose is the preferred sweetener component, but other sweet mono-, di- or polysaccharides may be employed as all or a portion of the sweetener component, such as dextrose, fructose, corn syrups or corn syrup solids, high fructose corn syrups and the like. Nutritive and non-nutritive, intensive sweeteners such as saccharin, Sucralose TM, Acesulfame K TM and the like may also be employed as all or part of the sweetener component. The use of intensive sweeteners may be accompanied by use of suitable sweet or non-sweet bulking agents to provide a desired solids levels; however, bulking agents will typically not be needed. All of these components are to be included in the term "sweetener" as employed in this invention; provided however, that in the case of syrups only the solids portion is included as sweetener.

As will be appreciated by those skilled in the art, this invention could be utilized in the formulation of a low/no fat and low/no sugar pudding by the use of an intensive sweetener. If desired, the pudding formulation could be free of all sugars by using lactose-free milk solids or by eliminating milk solids altogether and substituting an alternate source of soluble calcium, such as calcium lactate or calcium biphosphate.

The pudding composition of the present invention preferably may also contain an emulsifier/stabilizer component which aids in dispersing and mixing of dry ingredients and contributes to the desired firm, smooth texture. A preferred emulsifier/stabilizer is sodium stearoyl-2-lactylate. Other suitable emulsifier/stabilizer ingredients include, for example, mixtures of mono- and diglycerides prepared by direct esterification of edible fatty acids and glycerine.

The term emulsifier/stabilizer is meant to indicate that the ingredient serves as both an emulsifier and a stabilizer. In the case of fat-free puddings, the emulsifier functionality is not needed and the ingredient functions solely as a stabilizer. In the case of fat-containing puddings, the ingredient provide both emulsifier and stabilizer functionalities.

The term fat-free, as used in this invention, is meant to include the presence of a low amount of a fatty emulsifier/stabilizer material or fat from other sources so long as the pudding contains less than 0.5 grams of fat per serving. It is also within the scope of this invention that, in accordance with copending, commonly assigned U.S. patent application, Ser. No. (KGF Case 19641), that the stabilizer ingredient can be totally or partially replaced by a low level (up to 0.5%) of polyphosphates, preferably pyrophosphates.

For the non-fat puddings of this invention, water, skim milk and/or non-fat milk solids will be typically utilized. For those puddings which contain a low level of fat, low-fat or whole milk may also be used as ingredients as well as any non-milk fat or oil, (such as any unprocessed or processed (e.g., hydrogenation, fractionation, interesterification) vegetable or animal fat or oil or fraction thereof, such as derived from soybean oil, corn oil, coconut oil, cottonseed oil, peanut oil, safflower oil, palm kernel oil, sunflower oil, palm oil, rapeseed oil or the like.

According to a preferred embodiment of this invention the starch component of the pudding formulation consists of a combination of higher and lower modified, uncooked starches typically at a weight ratio of 1:1 to 9:1. The higher modified starch is typically a cross-linked, substitued starch, such as tapioca, waxy maize or corn starch. The lower modified (e.g., unmodified) starch will typically be a tapioca, waxy maize or corn starch.

For producing the Packaged, ready-to-eat puddings of this invention the various ingredients of the composition are initially admixed, such as in the manner described above. The mixture is then mixed to effect thorough and complete dispersion, such as by homogenization. Typically, the mixture is heated to a temperature of up to about 130° F. and then passed through a mixing apparatus (e.g., a Manton-Gaulin ™ homogenizer or a Bran-Lubbe ™ homogenizer) in either a single or multiple-stage at an appropriate pressure. Since the preparation of home-made puddings has no true counterpart to a homogenization step, the products made according to the present invention can often be characterized as having textural and organoleptic properties even more preferred than the home-made "standard".

The ultra-high temperature processing of the pudding composition typically will be conducted in scraped-surface heat exchange apparatus so as to best accommodate the increasing viscosity of the mixture during heating. Typically, the composition will be heated to a temperature of about 140° F. prior to being passed to ultra-high temperature processing. In the ultra-high temperature processing step, the composition will typically be heated to a temperature range of from about 275° F. to about 300° F. and then introduced into a suitable holding tube, to be held there at such temperature for the necessary time required to effect cooking and microbial kill. Thereafter, the cooked composition is cooled to a temperature suitable for filling into containers which are then sealed. Where the product container is a plastic material to be sealed with an adhesively-applied foil lid, cooling to a product temperature of below about 130° F., and preferably below 110° F.

In commercial operation it may be desirable to provide a hold tank between the homogenization step and the cooking step in order to serve as a buffer against process disruptions. If such a tank is present, the tank should keep the pudding temperature at about 40° F. to retard microbiological growth.

If an aseptic-packaging process is to be implemented, the process will further include steps of sterilizing the containers and lids into which the sterilized pudding is packaged and then filling the container with pudding in a sterile environment. Such known methods as superheated steam, hydrogen peroxide, ultraviolet light, high-intensity light, etc., are useful for sterilizing the packaging materials which, in the case of pudding, are typically composed of single-service, cup-shaped, plastic containers and flexible lid stock. The lid stock, may be foil-laminated polyester with a heat-sealable coating which will be heat sealed onto the container. The plastic container may be a thermoformed or molded container fabricated from a material such as high-impact polystyrene. These steps would also be desirable to reduce microbial activity even in the event that a true aseptic process in not being sought, such as when the pudding is placed in a refrigerated distribution system and sterility is not required but extended storage life is desirable.

This invention is further described but not limited by the following examples.

EXAMPLE 1

A chocolate-flavored, fat-free pudding was prepared having the following formulation:

| Ingredient | Weight % |
|---|---|
| Skim Milk | 70.00 |
| Water | 9.88 |
| Sucrose | 12.79 |
| Starch | 4.41 |
| Cocoa/Flavors/Colors | 2.57 |
| Sodium Stearoyl Lactylate | 0.20 |
| Sodium Alginate | 0.15 |

The pudding was prepared by adding water and skim milk to a batch tank and heating to 135° F. (57.2° C.). The sodium lactylate is then added to the tank. The remaining ingredients (except flavors) were then added and the temperature of the mix was again brought to 135° F. (57.2° C.). Flavors were added and the mix was homogenized at 2000 psig in a first stage and 500 psig in a second stage. The temperature was maintained at about 125° F. to 130° F. (51.7° to 54.4° C.) during homogenization. The mixture was then cooled to about 40° F. (4.4° C.) and held in a tank prior to being pumped in a continuous manner through a series of plate heat exchangers, wherein the temperature is raised to 185° F. (85° C.) and then through a series of scraped-surface heat exchanger where the temperature is elevated to 280° F. (137.7° C.). The formulation is maintained at 280° F. (137.7° C.) for about 15 seconds and then immediately cooled to about 150° F. (65.6° C.). The pudding formulation is then further cooled to 75° F. (21.1° C.) and packaged in single-serving plastic cups.

After one-day refrigerator storage the pudding was found to possess a desirable texture and mouthfeel comparable to pudding containing up to 5% fat. Viscosity of the pudding increases to a desirable thickness during the first day of storage. This desirable texture and mouthfeel was maintained for at least eight months of refrigerated storage.

EXAMPLE 2

A vanilla-flavored, low-fat pudding was prepared having the following formulation:

| Ingredient | Weight % |
|---|---|
| Low Fat Milk (2% fat) | 66.09 |
| Water | 18.10 |
| Starch | 4.10 |
| Sucrose | 10.10 |
| Sodium Stearoyl Lactylate | 0.20 |
| Flavorants | 0.36 |
| Sodium Alginate | 0.23 |

The pudding was prepared by heating the milk and water to 110° F. (43.3° C.). The emulsifier was then added. The dry ingredients were then added with alginate (mixed with sugar) added as the last of these dry ingredients. Flavor was added last. The formulation was heated to 134° F. (56.7° C.), homogenized in a two-stage homogenizer at 2500 psig and 500 psig, and then cooled to 45° F. (5.6° C.). The homogenized mix was then heated to at 280° F. (137.8° C.) held for about 20 seconds at this temperature and thereafter cooled to 75° F. (23.9° C.) and packaged in single-serving plastic cups. The pudding was evaluated as having good body and fine protein structure.

EXAMPLE 3

Puddings prepared in the manner of Example 2 were prepared using different gums and a different starch level:

| Ingredient | Weight % | Weight % |
|---|---|---|
| Low Fat Milk | 66.09 | 66.09 |
| Water | 18.10 | 18.10 |
| Starch | 5.00 | 4.80 |
| Sucrose | 10.10 | 10.10 |
| Sodium Stearoyl Lactylate | 0.20 | 0.20 |
| Flavorants | 0.36 | 0.36 |
| Xanthan | 0.15 | — |
| Carrageenan (Kelco Seagel TM DP437) | — | 0.10 |
| Lecithin | — | 0.15 |

The xanthan-containing pudding was thin and contained large protein aggregates. The carrageenan-containing pudding had a grainy texture, produced a coating in the mouth and was very protein aggregated.

Having thus described the invention what is claimed is:

1. A packaged, high temperature-processed, ready-to-eat pudding, wherein the high temperature is 265° or higher, prepared from a formulation comprising a fat content of less than 3% by weight, water, a source of soluble calcium, thickening agent, sweetener, emulsifier/stabilizer and/or polyphosphate and from 0.01 to 1.5% by weight of an ungelled, calcium-sensitive, thermally-irreversible, gelling hydrocolloid selected from the group consisting of algin and salts thereof, low methoxyl pectin, gellan gum and combinations thereof.

2. The pudding formulation of claim 1 wherein the calcium-sensitive hydrocolloid consists of sodium alginate at a level of from 0.01 to 0.5%.

3. The pudding formulation of claim 2 wherein the pudding is fat-free.

4. The pudding formulation of claim 3 wherein the source of soluble calcium is milk solids.

5. The pudding formulation of claim 3 wherein the pudding is both fat-free and sugar-free.

6. The pudding formulation of claim 3 wherein the calcium-sensitive gelling hydrocolloid is the only non-starch gelling hydrocolloid present.

7. A process for producing a packaged, ready-to-eat pudding having a fat level of from 0 to 3% comprising the steps of: combining and mixing water, a source of soluble calcium, starch, sweetener, emulsifier/stabilizer and/or polyphosphate and an ungelled, calcium-sensitive, thermally-irreversible, gelling hydrocolloid at a level of from 0.01 to 1.5%, said hydrocolloid being added to an aqueous solution containing soluble calcium at a temperature of less than 150° F. and said hydrocolloid being selected from the group consisting of algin and salts thereof, low methoxyl pectin, gellan gum and combinations thereof; homogenizing the mix; heating the mixture to a temperature above 265° F. for a sufficient period of time to sterilize the mix and cook the starch; cooling the sterilized mix to a temperature below 140° F.; and packaging the cooled pudding.

8. The process of claim 7 wherein the source of soluble calcium is milk solids.

* * * * *